(12) United States Patent
Schreiber et al.

(10) Patent No.: US 10,837,820 B2
(45) Date of Patent: Nov. 17, 2020

(54) LOAD CELL FOR A SCALE

(71) Applicant: Bizerba SE & Co. KG, Balingen (DE)

(72) Inventors: Annika Schreiber, Balingen (DE); Frank Metzger, Albstadt (DE)

(73) Assignee: Bizerba SE & Co. KG, Balingen (DE)

( * ) Notice: Subject to any disclaimer, the term of this patent is extended or adjusted under 35 U.S.C. 154(b) by 297 days.

(21) Appl. No.: 15/908,232

(22) Filed: Feb. 28, 2018

(65) Prior Publication Data

US 2018/0252571 A1  Sep. 6, 2018

(30) Foreign Application Priority Data

Mar. 2, 2017   (DE) .......................... 10 2017 104 349

(51) Int. Cl.
*G01G 3/14* (2006.01)
*G01G 21/24* (2006.01)
(Continued)

(52) U.S. Cl.
CPC ........... *G01G 3/1404* (2013.01); *G01G 3/141* (2013.01); *G01G 3/1402* (2013.01);
(Continued)

(58) Field of Classification Search
CPC .... G01G 3/1404; G01G 3/1402; G01G 3/141; G01G 21/244; G01L 1/04; G01L 1/2231; G01L 1/225
(Continued)

(56) References Cited

U.S. PATENT DOCUMENTS 4,332,174 A * 6/1982 Suzuki ................. G01G 3/1404
177/211
5,086,879 A * 2/1992 Latimer .................. A47F 9/046
186/61
(Continued)

FOREIGN PATENT DOCUMENTS

CA     2 141 635 C    9/1995
CN     201212834 Y    3/2009
(Continued)

OTHER PUBLICATIONS

Translation of WO-2016086528-A1 (Year: 2016).*
(Continued)

*Primary Examiner* — Nathaniel T Woodward
(74) *Attorney, Agent, or Firm* — Kilpatrick Townsend & Stockton LLP

(57) ABSTRACT

The invention relates to a load cell for a scale having a monolithically configured measurement body that has a force reception section, a force introduction section, and a joint section arranged between the force reception section and the force introduction section, wherein the measurement body has a longitudinal axis and an axial end at the force reception side and an axial end at the force introduction side; having at least one strain gauge arranged at the upper side on the joint section for detecting a stretching deformation of the measurement body; and having a circuit board that is electrically connected to the at least one strain gauge, that is arranged at the force reception side, and that has electronics arranged thereon for processing at least one output signal of the at least one strain gauge.

19 Claims, 4 Drawing Sheets

Figure 1:
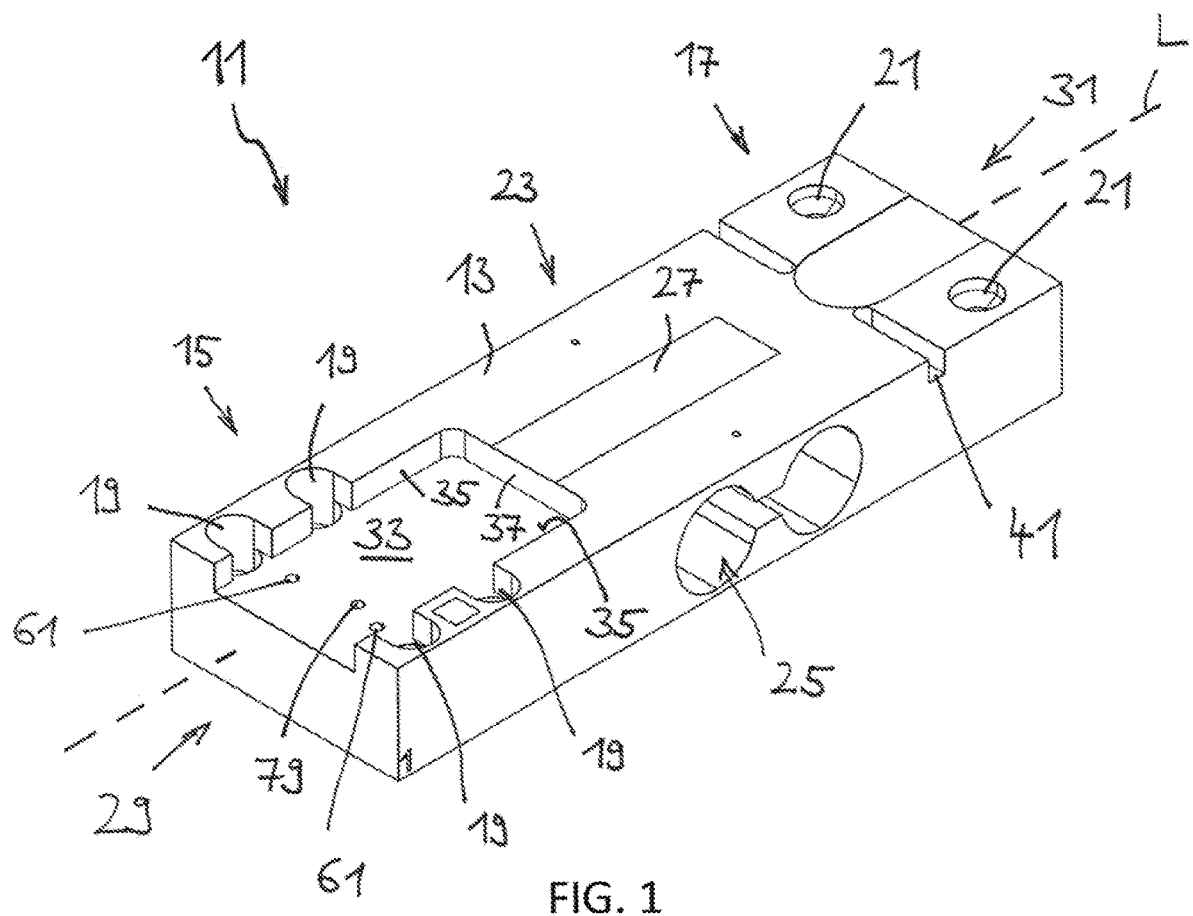

(51) Int. Cl.
  *G01L 1/04* (2006.01)
  *G01L 1/22* (2006.01)
(52) U.S. Cl.
  CPC .............. *G01G 21/244* (2013.01); *G01L 1/04* (2013.01); *G01L 1/225* (2013.01); *G01L 1/2231* (2013.01)
(58) Field of Classification Search
  USPC .................................................... 73/865.627
  See application file for complete search history.

(56) References Cited

U.S. PATENT DOCUMENTS

| | | | | |
|---|---|---|---|---|
| 5,723,826 | A * | 3/1998 | Kitagawa | G01G 3/147 177/211 |
| 7,235,746 | B2 * | 6/2007 | Williamson | G01G 19/44 177/126 |
| 8,561,482 | B2 * | 10/2013 | Aumard | G01G 3/1412 73/862.627 |
| 8,664,546 | B2 * | 3/2014 | Schon | G01G 23/017 177/124 |
| 9,778,120 | B2 * | 10/2017 | Sato | G01L 1/2243 |
| 2016/0047702 | A1 | 2/2016 | Bodmer et al. | |

FOREIGN PATENT DOCUMENTS

| | | |
|---|---|---|
| CN | 102169007 A | 8/2011 |
| CN | 104374453 A | 2/2015 |
| CN | 204241078 U | 4/2015 |
| DE | 103 59 460 A1 | 7/2005 |
| DE | 10 2010 043 287 A1 | 5/2012 |
| DE | 10 2014 111 682 A1 | 2/2016 |
| DE | 10 2014 112 415 A1 | 3/2016 |
| EP | 0 670 479 A1 | 9/1995 |
| EP | 2 416 130 B1 | 8/2010 |
| WO | 2016/086528 A1 | 6/2016 |
| WO | WO-2016086528 A1 * | 6/2016 ............... G01G 3/14 |

OTHER PUBLICATIONS

German Search Report in related German Patent Application No. 10 2017 104 349.7 dated Jul. 5, 2017 (two pages).
Search Report of corresponding European Patent Application No. 18 155 465.0 dated Aug. 2, 2018 (eight pages).
Chinese Office Action dated Aug. 27, 2020 in related Chinese Patent Application No. 2018101705722 (eleven pages).

* cited by examiner

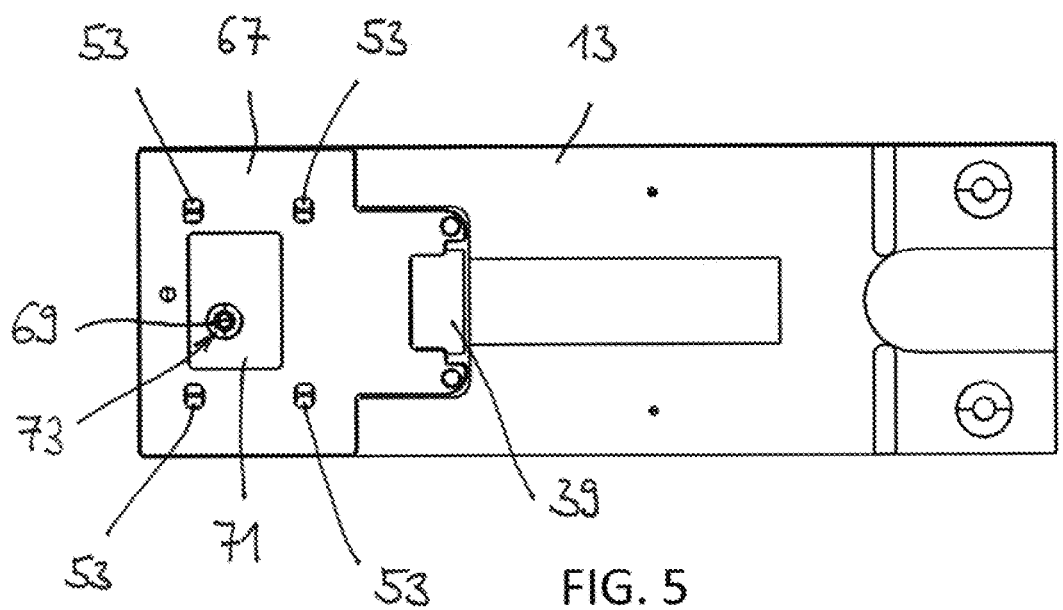

LOAD CELL FOR A SCALE

This application claims priority to German Application No. 102017104349.7, filed Mar. 2, 2017, the disclosure of which is incorporated by reference herein.

The present invention relates to a load cell for a scale having a monolithically configured measurement body that has a force reception section, a force introduction section, and a joint section arranged between the force reception section and the force introduction section, wherein the measurement body has a longitudinal axis and an axial end at the force reception side and an axial end at the force introduction side; having at least one strain gauge arranged at the upper side on the joint section for detecting a stretching deformation of the measurement body; and having a circuit board that is electrically connected to the at least one strain gauge, that is arranged at the force reception side, and that has electronics arranged thereon, in particular including an analog-to-digital converter, for processing at least one output signal of the at least one strain gauge.

It is known from the prior art with such load cells to attach the circuit board edgewise laterally to the force reception section of the measurement body. The height of the measurement body must in this respect at least correspond to the width of the edgewise attached circuit board to avoid a projection of the circuit board upwardly and/or downwardly over the measurement body. The minimum construction height of the load cell is thus limited by the usually not insubstantial height of the circuit board.

It is the underlying object of the invention to provide a load cell of the initially named kind that enables a smaller construction height.

This object is satisfied by a load cell having the features of claim 1 and in particular in that the force reception section has a recess, in particular a recess bounded at three sides, at the upper side which is open, in particular exclusively, toward the end of the measurement body at the force reception side and into which the circuit board is inserted horizontally.

The height of the measurement body and thus the construction height of the load cell can be selected independently of the dimensions of the circuit board due to the arrangement of the circuit board at or on the upper side of the force reception section so that construction heights are possible for the load cell that are smaller than the width of the circuit board. The construction height of the load cell in accordance with the invention is only restricted by the physical properties of the measurement body. The construction height of a scale body of a scale in which the load cell is accommodated together with a load plate arranged above it can be kept small by a small construction height of the load cell. The circumstance that the circuit board is inserted into a recess additionally contributes to the construction height of the load cell being able to be kept small. The circuit board and the at least one strain gauge can furthermore simply be electrically connected to one another since they are each arranged at the upper side on the measurement body, i.e. on the same side of the measurement body. For example, the electrical connection between the circuit board and the at least one strain gauge can take place, in particular exclusively, by bonding or by bonding wires.

The recess is in particular bounded by two longitudinal side walls extending in the direction of the longitudinal axis of the measurement body and oppositely disposed with respect to the longitudinal axis and by a front side wall facing the end at the force introduction side. The force reception section can in particular have fastening holes for fastening the load cell to a scale that are arranged at both sides of the recess and/or at both sides of the circuit board with respect to the longitudinal axis of the measurement body. It is, however, generally also possible that the recess is configured such that it is not only open toward the end of the measurement body at the force reception side, but also in the direction of at least one of the two longitudinal sides of the measurement body. The recess is preferably rectangular and/or is formed centrally at the upper side of the force reception section with respect to the longitudinal axis of the measurement body.

The circuit board is preferably arranged completely sunk into the recess to keep the construction height of the load cell particularly small. The circuit board is then inserted into the recess such that its upwardly directed side does not project over the recess-free regions of the upper side of the measurement body. The upwardly directed side of the circuit board is then at most located at the level of the upper side of the joint section or thereunder.

In accordance with a preferred embodiment of the invention, the circuit board projects outwardly over the end of the measurement body at the force reception side. The circuit board can furthermore be provided at its side facing the end of the measurement body at the force reception side with at least one hardware interface that is electrically connected to the electronics and that is freely accessible from outside the load cell. It is preferred in this respect if the respective hardware interface projects outwardly over the end of the measurement body at the force reception side and/or is configured as part of a plug-in connection, in particular as a plug or socket, whose plug-in direction extends horizontally, in particular along the longitudinal axis of the measurement body. The circuit board and/or the respective hardware interface can be simply contacted by the projection of the circuit board or of the respective hardware interface over the end of the measurement body at the force reception side. This in particular applies when the respective plug-in connection is a latching plug-in connection that requires the pressing of a tab to release the plug-in connection again. A hardware interface, e.g. a USB interface, can be provided to connect the circuit board to a CPU board of the scale that is configured to process the signals, in particular weight value signals, provided by the electronics. Furthermore, a further hard interface can be provided, e.g. a serial interface that serves e.g. a balancing of the load cell in production.

The circuit board is preferably populated at one side, with the circuit board being inserted into the recess with its population side facing downwardly and/or with its solder side facing upwardly. With a circuit board in which the population side faces downwardly, the electronic assemblies of the electronics are particularly well protected against damage in a simple manner. With an upwardly facing solder side, the circuit board and the at least one strain gauge can be electrically connected to one another in a particularly simple manner, for example by means of bonding or bonding wires. The electronic assemblies, or at least some of them, can in particular be wired assemblies that are positioned from the population side in through hole installation and that are soldered on the oppositely disposed solder side. In general, however, surface-mounted assemblies can also be used, in particular at least in part and/or with two-sided population.

To fixedly connect the circuit board to the measurement body, the circuit board can be fastened by means of at least one fastening screw extending through a respective passage hole provided in the circuit board in a respective hole, in particular a blind hole, formed in the recess and having an internal thread. Two fastening screws are preferably provided.

The circuit board preferably has at least one spacer at its downwardly directed side. The circuit board can hereby be kept at a defined spacing from the base of the recess. This is in particular of advantage when the circuit board is populated at its downwardly facing side. The length of the respective spacer is then in particular larger than the height of the electronic assemblies that are mounted on the downwardly facing side of the circuit board.

The respective spacer can be configured as a spacer sleeve, i.e. can be formed as a sleeve, and the aforesaid respective fastening screw can extend through the respective spacer sleeve or through the respective sleeve-like spacer. The respective spacer sleeve then respectively satisfies a dual function. On the one hand, the circuit board can be kept spaced from the base of the recess; on the other hand, it represents a guide for the respective fastening screw to securely find the hole formed in the recess on the screwing in.

In accordance with a preferred embodiment of the invention, a protective cover that can be formed as a cover plate or that can comprise a cover plate is provided for the circuit board, in particular for a populated side of the circuit board, in particular the aforesaid population side, wherein the circuit board is combined with the protected cover to form a module that is inserted into the recess, in particular with the populated side of the circuit board and/or of the protective cover facing downwardly. The electronics arranged on the circuit board, in particular the analog-to-digital converter, can be well-protected from damage by the protective cover. The protective cover preferably has a respective cut-out for the aforesaid respective fastening screw for the circuit board and/or for the aforesaid respective spacer sleeve.

The circuit board and the protective cover are preferably mechanically connected to one another via a clip connection. A simple and in particular releasable connection can hereby be provided. The protective cover preferably has a plurality of bending snap-fit hooks that project in the direction of the circuit board and that engage behind the circuit board in a shape-matched manner in the assembled state to form the clip connection. The protective cover can be produced from plastic.

It is furthermore preferred for the protective cover to have a web which projects in the direction of the circuit board, which is formed at at least the oppositely disposed sides with respect to the longitudinal axis, and on which the circuit board lies. The web region formed on the respective side can be continuous or interrupted, in particular by the bending snap-fit hooks. The protective cover is in particular at least sectionally stiff at its front side facing the force reception end of the measurement body at the force reception side. The aforesaid at least one hardware interface can be arranged at the web-free front side or at the web-free region of the front side.

In accordance with a preferred embodiment of the invention, a removal cover, in particular a calibration cover and/or in the form of a cover plate, is provided that is fastened, in particular directly, to the force reception section of the measurement body by means of a fastening element, secured by a calibration mark, in particular in the form of a sticker or of a calibration seal, and that covers the recess from above, in particular such that the electronics or at least some of them and/or at least a fastening element for the circuit board are/is only accessible from the outside after removing the calibration seal. With a calibrated scale, the calibration-relevant components of the electronics can thus be protected against unauthorized manipulation. When the fastening element is removed by a person not authorized to do so to remove the calibration cover, the calibration mark is necessarily destroyed, whereby the scale loses its calibration, i.e. is decalibrated.

The fastening element is preferably a fastening screw that is screwed into a hole, in particular a blind hole, in the recess that has an internal thread, with the fastening screw extending through a passage hole provided in the calibration cover and through a corresponding passage hole provided in the circuit board and, optionally, through a corresponding passage hole provided in a protective cover.

The force reception section preferably has at least one fastening hole for a respective fastening means, in particular a respective screw, for fastening the load cell to a scale, with the calibration cover simultaneously also covering the respective fastening hole and/or the respective fastening means since the respective fastening hole and/or the respective fastening means are generally calibration-relevant in a calibrated scale.

The measurement body can have a groove, in particular a one-part or two-part groove, extending transversely, in particular perpendicular, to the longitudinal direction of the measurement body at the upper side between the force introduction section and the joint section for the mechanical decoupling of the force introduction section.

The measurement body can, for example, have a height of at most 40 mm, preferably at most 30 mm, and/or a width of at least 40 mm, preferably of at least 50 mm, and/or a width-to-height ratio of at least 1.5, preferably at least 2.

The present invention furthermore relates to a scale having a load cell as has been described above.

Further advantageous embodiments of the invention are described in the claims, in the description of the Figures and in the drawing.

Figure 2:
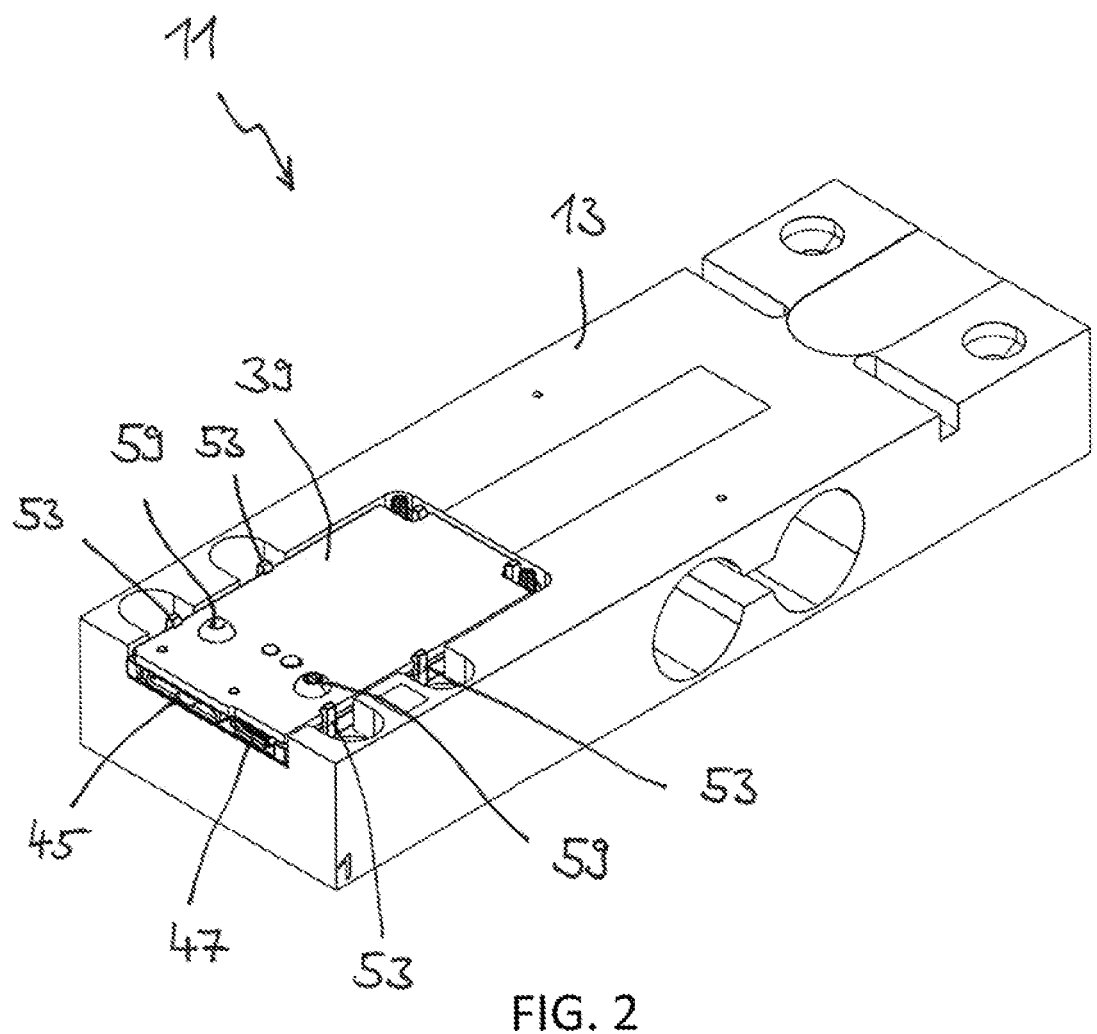
Figure 3:
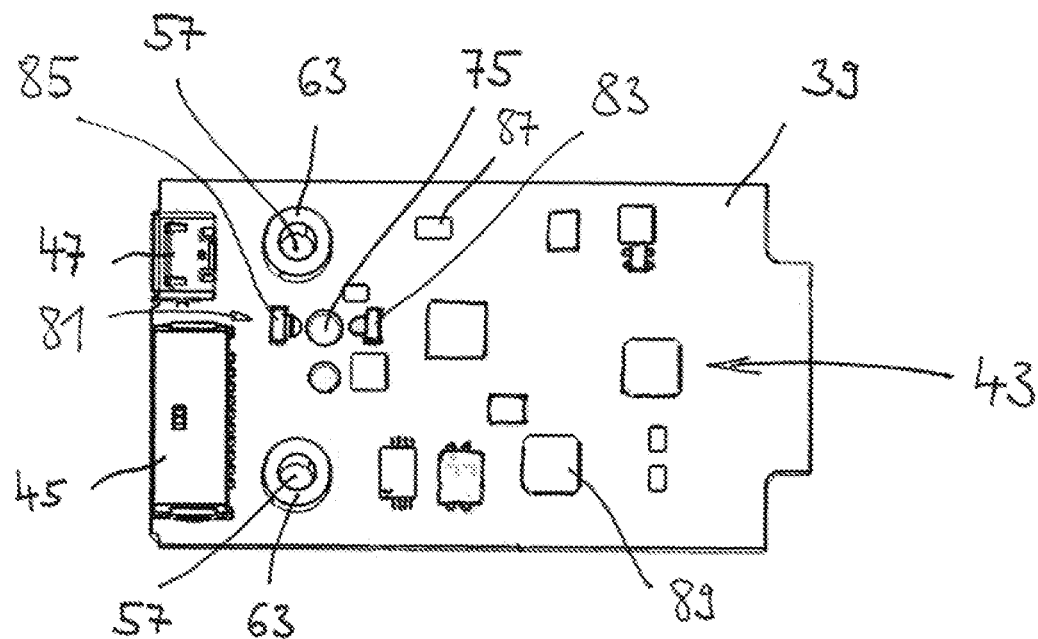
Figure 4:
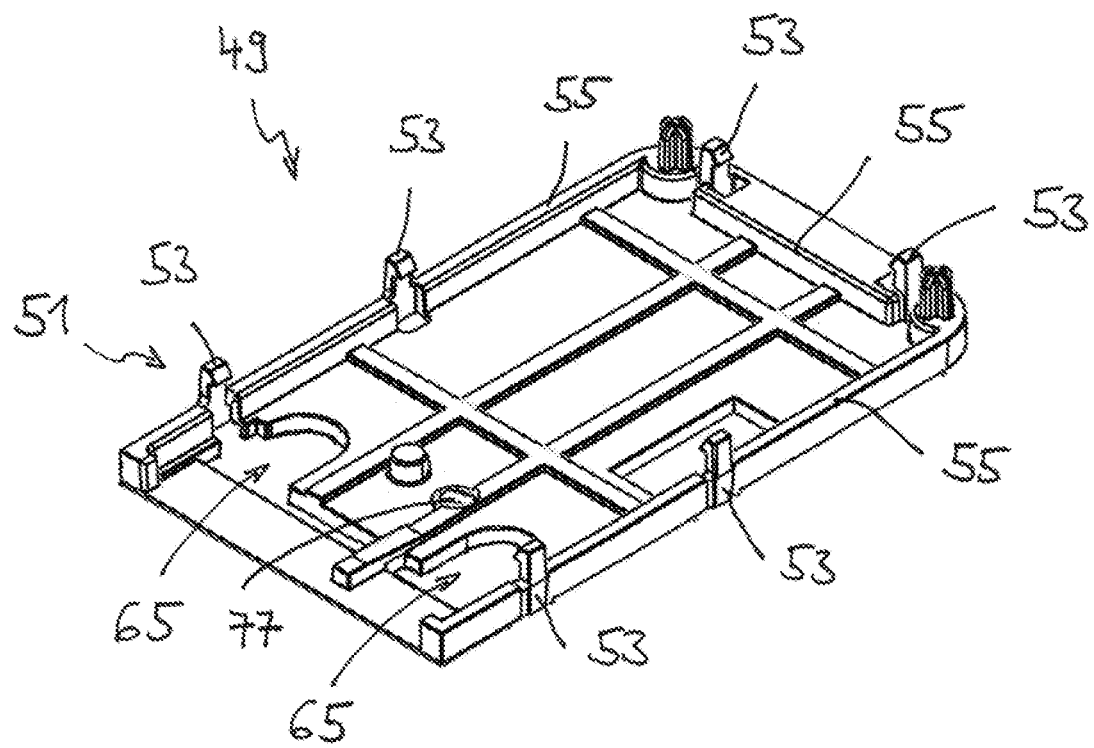

The invention will be described in the following by way of example with reference to the drawing. There are shown, FIG. 1 a perspective view of a load cell in accordance with the invention without an inserted circuit board;

FIG. 2 the load cell of FIG. 1 with an inserted circuit board;

FIG. 3 the circuit board of FIG. 2 in a view from below;

FIG. 4 a perspective view of a protective cover for the circuit board; and

FIG. 5 a plan view of the load cell in accordance with FIGS. 1 and 2 with a calibration cover.

A load cell 11 is shown in FIG. 1 for a calibrated scale that comprises a measurement body 13 that is formed monolithically as a block and that has a force reception section 15 and a force introduction section 17. The force reception section 15 is fastenable to a fixed part of the scale via four fastening holes 19 and a load cross-piece bearing a load plate is fastenable (not shown) to the force introduction section via two fastening holes 21. A joint section 23 is provided between the two sections 15, 17 so that the measurement body 13 acts as a bending bar or as a bending beam. For this purpose, a central passage 25 is formed in the joint section 23; it is in particular dog-bone-shaped in cross-section and completely passes through the measurement body 13. The measurement body 13 overall has a longitudinal axis L, an end 29 at the force reception side, and an end 31 at the force introduction side. A groove 41 extending perpendicular to the longitudinal axis L is provided at the upper side of the measurement body 13 between the force introduction section 17 and the joint section 23 to achieve a mechanical decoupling of the force introduction section 12.

A plurality of only schematically shown strain gauges 27 are arranged above the passage 25 at the outer side of the measurement body 13 and detect a deformation of the measurement body 13 in the region of the joint section in a manner known per se. The load cell 11 is therefore a strain gauge load cell. A load on the force introduction section 17 produces a deflection or bending of the measurement body 13 proportional thereto so that the weight of the load can be determined from the deflection or from a stretching of the measurement body 13.

A rectangular recess 33 is formed at the upper side in the force reception section 15 and is bounded by two longitudinal side walls 34 extending in the direction of the longitudinal axis L of the measurement body 13 and by a front side wall 37 facing the end 31 at the force introduction side. The recess 33 is open toward the end 29 of the measurement body 13 at the force reception side. The recess 33 is in this respect arranged centrally with respect to the longitudinal axis L between two fastening holes 19 toward its one longitudinal side and two fastening holes 19 toward its other longitudinal side.

A circuit board 39 is inserted horizontally into the recess 33, as is shown in FIG. 2. The circuit board 39 is electrically connected to the strain gauges 27 via bonding wires, not shown, and is populated with a plurality of electronic assemblies of electronics 43 that in particular comprise an analog-to-digital converter 89. The electronics 43 are provided for the signal processing of at least one output signal of the strain gauge 27 that in particular forms a Wheatstone bridge, in particular for calculating a weight value.

The circuit board 39 is only populated on one side so that the circuit board 39 has a population side, that is shown in FIG. 3, and a solder side. The circuit board 39 is inserted into the recess 33 in the manner of overhead installation with its population side facing downwardly so that its solder side faces upwardly so that the aforesaid bond connection between the circuit board 39, namely its solder side, and the strain gauges 27 can be established particularly simply. The fact that the upper side of the circuit board 39 is admittedly completely sunk into the recess, but is only arranged just beneath the upper side of the joint section 39, also contributes to this.

A load cell 11 having a small construction height can be implemented by the arrangement of the circuit board 39 in the recess 33 at the upper side of the measurement body 13.

The circuit board 39 has two hardware interfaces 45, 47 at its side facing the end 29 of the measurement body 13 at the force transmission side; they are electrically connected to the electronics 43, are formed as respective sockets of a plug-in connection, and are freely accessible from outside the load cell 11 so that the respective associated plugs can be plugged into the sockets 45, 47 along the longitudinal axis L of the measurement body 13 or can be released therefrom. The hardware interface 45 is a serial interface via which a balance of the load cell 11 is possible during the manufacture of the load cell 11. Calibration data of the load cell 11 are in this respect in particular stored in a calibration-enabled memory 87 of the electronics 43, with an electronic write protection subsequently being activated to prevent a later unauthorized manipulation of the calibration data. The hardware interface 47 is a USB interface via which the weight value calculated by the electronics 43 can be read by a CPU board, not shown, external to the load cells or can be output to it.

As can be rudimentarily recognized in FIG. 2, the circuit board 39 and the two hardware interfaces 45, 47 project outwardly over the end 29 of the measurement body 13 at the force reception side to further facilitate the accessibility to the hardware interfaces 45, 47.

A protective cover 49 that is shown in FIG. 4 is provided to protect the electronics 43. The protective cover 49 is combined with the circuit board 39 via a releasable mechanical clip connection 51 to form a module, with the circuit board 39 being inserted into the recess 33 together with the protective cover 49, and indeed with the population side of the circuit board 39 or of the protective cover 49 at the front. The clip connection 51 is formed in that the protective cover 49 has a plurality of bending snap-in hooks 53 that project in the direction of the circuit board 39 and that engage with shape matching behind the upper side of the circuit board 39. The circuit board 39 is in this respect on a web 55 of the protective cover 49 projecting in the direction of the circuit board 39, said web being formed at the two longitudinal sides and at the front side of the protective cover 49 facing the end 31 at the force introduction side.

The protective cover 49 is in contrast web-free at its front side facing the end 29 of the measurement body 13 at the force reception side since the two hardware interfaces 45, 47 are arranged there that are accessible from the outside, as is explained above.

The circuit board 39 has two passage holes 57 (FIG. 3) via which the circuit board 39 is fastened by means of two fastening screws 59 (FIG. 2) in corresponding blind holes 61 (FIG. 1) formed in the recess 33 and each having an internal thread. The fastening screws 59 respectively extend here through the interior of a respective spacer sleeve 63 that respectively projects downwardly from the lower side of the circuit board 39, that engages through a corresponding respective cut-out 65 in the protective cover 49, and that sits on the base of the recess 33.

Furthermore, a calibration cover 67 (FIG. 5) is provided that is fastened by means of a fastening screw 69 to the load cell 11 and that covers the recess 33 and thus the circuit board 39 and the two fastening screws 59 from above and thus inaccessibly from the outside.

The fastening screw 69 is screwed in a blind hole 79 formed in the recess 33 and having an internal thread. For this purpose, the fastening screw 69 extends through a passage hole 73 formed in the calibration cover 67 and covered by the fastening screw 69 in FIG. 5, through a passage hole 75 formed in the circuit board 39, and through a passage hole 77 formed in the protective cover 49, with the three passage holes 73, 75, 77 being arranged in alignment with one another in the direction perpendicular to the surface of the measurement body 13.

The presence of the fastening screw 69 can be recognized by a light barrier 81 attached to the lower side of the circuit board 39 and covered inaccessibly from the outside by the calibration cover 67. For this purpose, the transmitter 83 and the receiver 85 of the light barrier 81 are arranged on two mutually oppositely disposed sides of the passage hole 75 formed in the circuit board so that the light barrier 81 is interrupted by the screwed-in fastening screw 69. The light barrier 81 is configured such that a switch signal is generated when the light barrier 81 is no longer interrupted by the fastening element 69, i.e. when the fastening screw 69 is unscrewed.

The switch signal of the light barrier 81 is used to cancel the above-explained electronic write protection of the memory 83 having the calibration data of the load cell as is required for a permitted recalibration of the load cell 11.

Since the calibration cover 67 is provided with a calibration mark 71 in the form of a sticker that is shown as transparent and that is adhesively bonded to the fastening screw 69 for the calibration cover 67, a determination can be made by a visual check if the fastening screw 69 for the calibration cover 67 has been removed since the calibration mark 71 is then necessarily destroyed. If the fastening screw 69 is removed by an authorized person, the validity of the calibration is, however, maintained, which is in particular made visible in that the load cell 11 is provided with a maintenance code.

As can further be recognized from FIG. 5, not only the recess 33 is covered by the calibration cover 67, but additionally also the fastening holes 19 via which the load cell 11 is fastenable to a fixed part of a scale by means of screws and said screws are covered so that it is also recognizable when this fastening has been accessed.

REFERENCE NUMERAL LIST 11 load cell
13 measurement body
15 force reception section
17 force introduction section
19 fastening hole
21 fastening hole
23 joint section
25 passage
27 strain gauge
29 end
31 end
33 recess
35 longitudinal side wall
37 front side wall
39 circuit board
41 groove
43 electronics
45 hardware interface
47 hardware interface
49 protective cover
51 clip connection
53 bending snap-in hook
55 web
57 passage hole
59 fastening screw
61 blind hole
63 spacer sleeve
65 cut-out
67 calibration cover
69 fastening screw
71 calibration mark
73 passage hole
75 passage hole
77 passage hole
79 blind hole
81 light barrier
83 transmitter
85 receiver
87 memory
89 analog-to-digital converter
L longitudinal axis

The invention claimed is:

1. A load cell for a scale, the load cell comprising:
a monolithically configured measurement body defining a force reception section, a force introduction section, and a joint section arranged between the force reception section and the force introduction section, wherein the measurement body defines a longitudinal axis extending between a first axial end at the force reception section and a second axial end at the force introduction section, wherein the measurement body further defines an upper side extending between the first axial end and the second axial end, and wherein the force reception section defines a recess open on the upper side and the first axial side;
at least one strain gauge arranged at the upper side of the measurement body on the joint section and configured for detecting a stretching deformation of the measurement body; and
a circuit board positioned within the recess and electrically connected to the at least one strain gauge,
wherein the circuit board comprises electronics configured for processing at least one output signal of the at least one strain gauge and a hardware interface electrically connected to the electronics,
wherein the circuit board is configured to be inserted into the recess in a direction parallel to the longitudinal axis, and
wherein the hardware interface comprises a plug-in connection at the first axial end of the measurement body with a plug-in direction parallel to the longitudinal axis.

2. The load cell in accordance with claim 1, wherein the electronics includes an analog-to-digital converter.

3. The load cell in accordance with claim 1, wherein the circuit board is completely sunk into the recess.

4. The load cell in accordance with claim 1, wherein the circuit board projects outwardly over the first axial end of the measurement body at the force reception section.

5. The load cell in accordance with claim 1, wherein the hardware interface projects outwardly over the first axial end of the measurement body at the force reception section.

6. The load cell in accordance with claim 1, wherein the circuit board is populated at one side, wherein the circuit board is inserted into the recess with the populated side facing downwardly and/or with a solder side, opposite the populated side, facing upwardly.

7. The load cell in accordance with claim 1, wherein the circuit board is fastened in a respective hole formed in the recess and having an internal thread, by means of at least one fastening screw extending through a respective passage hole provided in the circuit board.

8. The load cell in accordance with claim 1, wherein the circuit board has at least one spacer at a downwardly directed side.

9. The load cell in accordance with claim 8, wherein the respective spacer is configured as a spacer sleeve and with a respective fastening screw extending through the respective spacer sleeve.

10. The load cell in accordance with claim 1, wherein a protective cover is provided for the circuit board, with the circuit board being combined with the protective cover to form a module that is inserted into the recess.

11. The load cell in accordance with claim 10, wherein the circuit board and the protective cover are mechanically connected to one another via a clip connection.

12. The load cell in accordance with claim 11,
wherein the protective cover has a plurality of bending snap-in hooks that project in the direction of the circuit board and that engage behind the circuit board with shape matching in the assembled state to form the clip connection.

13. The load cell in accordance with claim 10,
wherein the protective cover has a web which projects in the direction of the circuit board, which is formed at least at the oppositely disposed sides with respect to the longitudinal axis of the measurement body, and on which the circuit board lies.

14. The load cell in accordance with claim 13,
wherein the protective cover is at least sectionally web-free at its front side facing the end of the measurement body at the force reception side, with at least one hardware interface being arranged at the web-free front side or at the web-free region of the front side.

15. The load cell in accordance with claim 1,
wherein a removal calibration cover is provided that is fastened to the force reception section of the measurement body by means of a fastening element secured by a calibration mark and that covers the recess from above.

16. The load cell in accordance with claim 15,
wherein the fastening element is a fastening screw that is screwed into a hole that is formed in the recess, and that has an internal thread, with the fastening screw extending through a passage hole provided in the calibration cover and through a corresponding passage hole provided in the circuit board.

17. The load cell in accordance with claim 15,
wherein the force reception section has at least one fastening hole for a respective fastening means for fastening the load cell to a scale, with the calibration cover simultaneously also covering at least one of the respective fastening hole and the respective fastening means.

18. The load cell in accordance with claim 1,
wherein the measurement body has a groove extending transversely to the longitudinal direction of the measurement body at the upper side between the force introduction section and the joint section.

19. A scale having a load cell, the load cell comprising:
a monolithically configured measurement body defining a force reception section, a force introduction section, and a joint section arranged between the force reception section and the force introduction section, wherein the measurement body defines a longitudinal axis extending between a first axial end at the force reception section and a second axial end at the force introduction section, wherein the measurement body further defines an upper side extending between the first axial end and the second axial end, and wherein the force reception section defines a recess open on the upper side and the first axial side;

at least one strain gauge arranged at the upper side of the measurement body on the joint section and configured for detecting a stretching deformation of the measurement body; and a circuit board positioned within the recess and electrically connected to the at least one strain gauge wherein the circuit board comprises electronics arranged configured for processing at least one output signal of the at least one strain gauge and a hardware interface electrically connected to the electronics, wherein the circuit board is configured to be inserted into the recess in a direction parallel to the longitudinal axis, and wherein the hardware interface comprises a plug-in connection at the first axial end of the measurement body with a plug-in direction parallel to the longitudinal axis.

* * * * *